United States Patent
Kim et al.

(10) Patent No.: US 7,211,227 B2
(45) Date of Patent: May 1, 2007

(54) PLASMA REACTOR, PRODUCTION METHOD THEREOF, AND EMISSION CONTROL APPARATUS OF A VEHICLE

(75) Inventors: Yone-Seung Kim, Kunpo (KR); Hyung-Jei Cho, Seoul (KR); Chi-Young Jeong, Seoul (KR); Eun-Ki Hong, Kunpo (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 491 days.

(21) Appl. No.: 10/331,884

(22) Filed: Dec. 30, 2002

(65) Prior Publication Data

US 2003/0180199 A1    Sep. 25, 2003

(30) Foreign Application Priority Data

Mar. 19, 2002  (KR)  ................................. 2002-14716

(51) Int. Cl.
*B01J 19/08* (2006.01)

(52) U.S. Cl. ..................... 422/186.04; 60/275
(58) Field of Classification Search ........... 422/186.04; 60/275
See application file for complete search history.

(56) References Cited

U.S. PATENT DOCUMENTS

| | | | |
|---|---|---|---|
| 4,865,559 A * | 9/1989 | Clabburn | .................... 439/281 |
| 4,954,320 A * | 9/1990 | Birmingham et al. | .. 422/186.04 |
| 6,049,086 A | 4/2000 | Foggiato et al. | |
| 6,321,531 B1 | 11/2001 | Caren et al. | |
| 6,464,945 B1 * | 10/2002 | Hemingway | ................. 422/174 |
| 6,565,716 B1 * | 5/2003 | Ruan et al. | .................. 204/165 |
| 6,838,058 B2 * | 1/2005 | Nelson | .................. 422/186.04 |
| 6,887,440 B2 * | 5/2005 | Nelson et al. | ......... 422/186.04 |

FOREIGN PATENT DOCUMENTS

| | | |
|---|---|---|
| DE | 19635232 | 3/1998 |
| DE | 19903533 | 8/2000 |
| JP | 03-053775 | 5/1991 |
| JP | 04-005414 | 1/1992 |
| JP | 04-092378 | 8/1992 |
| JP | 04-363115 | 12/1992 |
| JP | 07-263119 | 10/1995 |
| JP | 11-347342 | 12/1999 |
| JP | 11-347356 | 12/1999 |
| JP | 2001-009232 | 1/2001 |
| JP | 2001-159309 | 6/2001 |
| JP | 2001-193441 | 7/2001 |
| WO | WO98/32531 A1 | 7/1998 |
| WO | WO 99/28015 | 6/1999 |
| WO | WO99/47242 A1 | 9/1999 |
| WO | WO00/51714 A1 | 9/2000 |

\* cited by examiner

*Primary Examiner*—Kishor Mayekar
(74) *Attorney, Agent, or Firm*—Morgan Lewis & Bockius LLP

(57) ABSTRACT

The present invention relates to a plasma reactor for reducing noxious gas by using a plasma reaction, a production method for such a plasma reactor, and an emission control apparatus for reducing noxious gas contained in exhaust gas of a vehicle by use of such a plasma reactor.

30 Claims, 6 Drawing Sheets

PLASMA REACTOR, PRODUCTION METHOD THEREOF, AND EMISSION CONTROL APPARATUS OF A VEHICLE

FIELD OF THE INVENTION

The present invention relates to a plasma reactor, a production method therefor, and an emission control apparatus of a vehicle. More particularly, the present invention relates to a plasma reactor for reducing noxious gas in vehicle exhaust by using a plasma reaction in an emission control, and a production method for such a plasma reactor.

BACKGROUND OF THE INVENTION

Diesel engines are becoming more prevalent because of their high efficiency and fuel economy, compared to gasoline engines. Accordingly, demand for such diesel engines is increasing. Diesel engine emissions are also strongly regulated. Therefore many schemes for reducing air diesel engine emissions are being investigated.

One scheme utilizes a plasma reaction. This has been recognized as promising technology because it can reduce oxidized nitrogen (NOx) and diesel particulate matter (PM) at the same time. A streamer corona reaction that is achieved by applying a high voltage to form plasma may be terminated by a spark produced at the streamer. Therefore a method and apparatus for maintaining the formed streamer is needed. Additionally, the reduction of the PM and NOx is not satisfactory in the prior art that utilizes a plasma reaction, and therefore improvements are needed.

In addition, other types of corona-generating apparatuses for forming plasma consume too much power to be used in a vehicle, or the function of corona discharging fails when an electrode is contaminated, by soot for example.

SUMMARY OF THE INVENTION

The present invention reduces noxious matter such as PM and NOx while also reducing power consumption and preventing short circuiting of a plasma reactor. The present invention also provides a production method for such a plasma reactor and an emission control apparatus utilizing such a plasma reactor.

A preferred embodiment of a plasma reactor according to the present invention includes: a first dielectric member; a second dielectric member disposed facing the first dielectric member; a gap spacer disposed between the first and second dielectric members so that a plasma region is formed therebetween; first and second electrode members disposed on the first and second dielectric members respectively, for generating a corona discharge; and first and second lead line members connected to the first and second electrode members so that the first and second electrode members receive electric voltage from the first and second lead line members respectively.

A preferred embodiment of a plasma reactor production method according to the present invention includes: preparing first and second dielectric members of a planar shape, and a plurality of gap spacers; orienting the second dielectric member to face the first dielectric member with the gap spacer situated therebetween to insulate the first dielectric member from the second so that a plasma region for enabling flow of exhaust gas is formed; forming first and second junction holes, for receiving first and second lead line members, respectively, within the first and second dielectric members and the gap spacers; forming an electrode member at each of the first and second dielectric members; and producing a plasma reactor cell by inserting the first and second lead line members, respectively, into the first and second junction holes such that the lead line members contact corresponding electrode members.

A preferred embodiment of an emission control apparatus for an engine according to the present invention includes: a housing for receiving exhaust gas from the engine; a plasma reactor disposed in the housing; a mat situated between the plasma reactor and the housing; a power supply unit comprising a power source of electric power, a transformer unit for transforming the electric power to an AC voltage of 100–1,000 Hz and 1–100 kV, and an electric cable for outputting the transformed electric power; and a plug for receiving the transformed electric power through the electric cable and for transmitting the received transformed electric power to the plasma reactor.

BRIEF DESCRIPTION OF THE DRAWINGS

The accompanying drawings, which are incorporated in and constitute a part of the specification, illustrate an embodiment of the invention, and, the following detailed description of the invention will be better understood with references to the drawings, in which.

DETAILED DESCRIPTION OF THE PREFERRED EMBODIMENTS

Figure 1A:
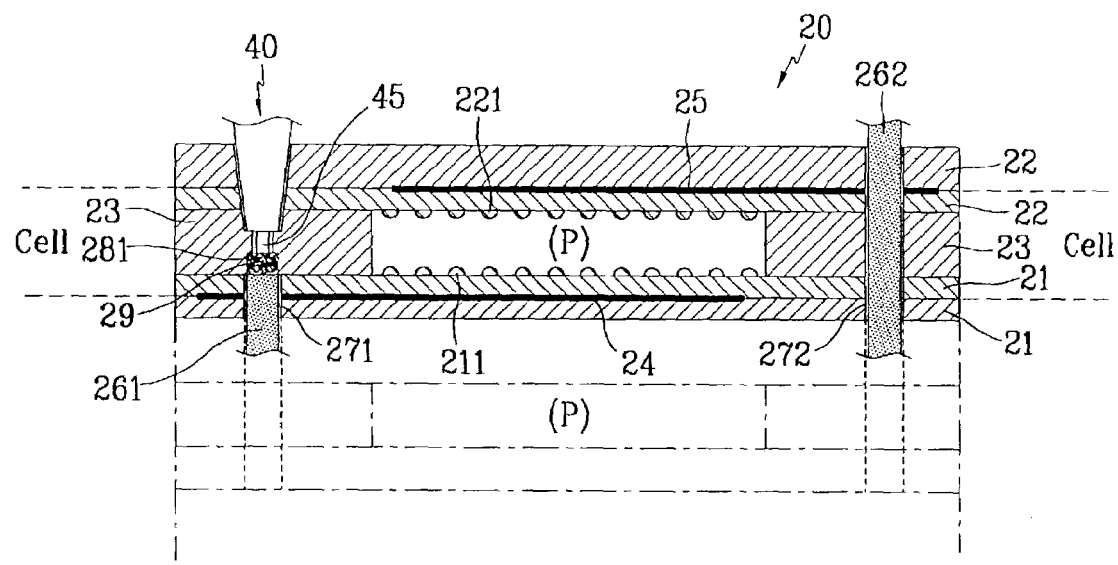
FIG. 1a is a cross-sectional view of a plasma reactor according to a preferred embodiment of the present invention.
Figure 1B:
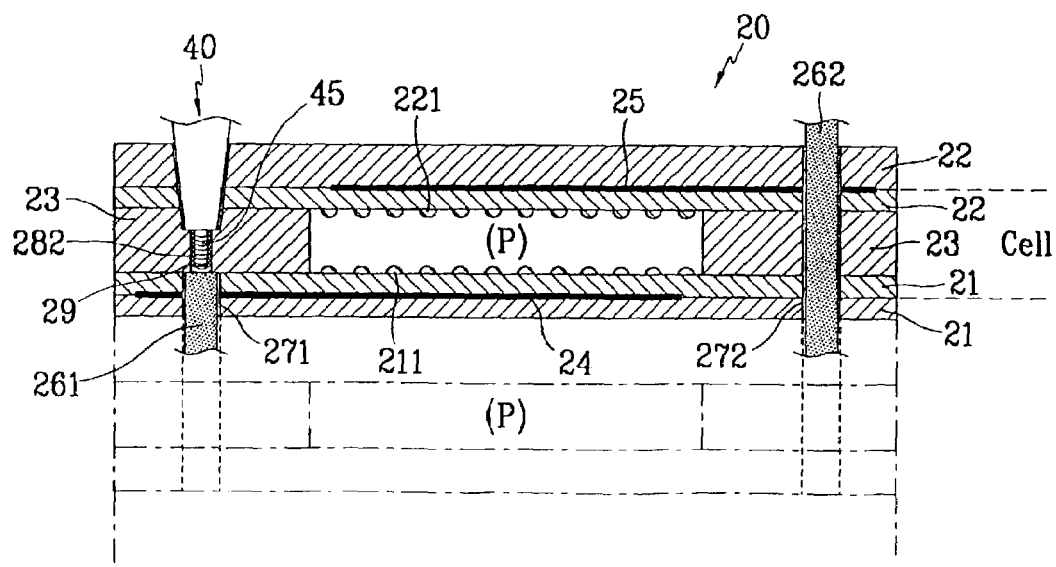
FIG. 1b is a cross-sectional view of a plasma reactor according to a second preferred embodiment of the present invention.
Figure 2:
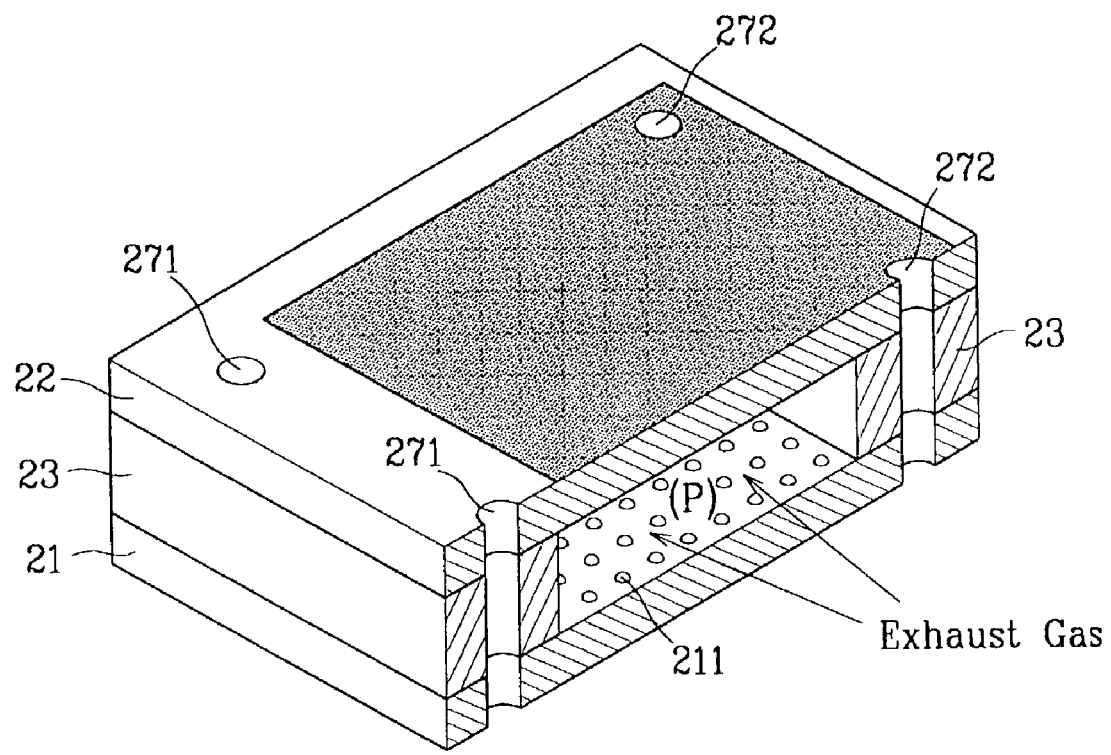
FIG. 2 is a cross-sectional perspective view of a cell of a plasma reactor according to a preferred embodiment of the present invention.

As shown in FIGS. 1a, 1b, and 2, a plasma reactor 20, according to a preferred embodiment of the present invention, is formed by accumulating a plurality of plasma reactor cells (or layers). In a plasma reactor cell a first dielectric member 21 and a second dielectric member 22 disposed facing each other across a gap spacer 23. This forms a plasma region "(P)" therebetween. First and second electrode members 24 and 25 are disposed on the first and second dielectric members 21 and 22, respectively, for powering a corona discharge. First and second lead line members 261, 262 are connected to the first and second electrode members 24, 25 respectively, so that the first and second electrode members receive electric voltage from the first and second lead line members.

The plasma reactor 20 is assembled in the following manner. First and second junction holes 271, 272 are formed at opposite sides of the first and second dielectric members 21, 22 and through the gap spacer 23. Plasma region P is between the junction holes. The first and second lead line members 261, 262 are respectively inserted into the first and second junction holes 271, 272.

The contacting surface of the first and second dielectric members 21, 22 are for contacting with noxious gas (or exhaust gas of an engine). Members 21, 22 are coated with a washcoat to increase the surface area and one or both of: an oxidization catalyst, and a de-NOx catalyst. If the contacting surfaces of the first and second dielectric members 21, 22 are coated with an oxidization catalyst, CO (carbon monoxide) emissions are reduced, and if they are coated with a de-NOx catalyst, NOx emissions are reduced. Also, the contacting surfaces of the first and second dielectric members 21, 22 are rough, for example, they are covered with many embossments 211, 221, respectively, so that the flow speed through the cell is reduced and, accordingly, the plasma reaction is more easily activated.

The thickness of the gap spacer 23 is in the range of two to five times the thickness of the first and second dielectric members 21, 22 to prevent sparks between the first electrode member 24 and the second lead line member 262, or between the second electrode member 25 and the first lead line member 261. Accordingly, the distance between the first and second electrode members 24, 25 is at least four times the thickness of each of the first and second dielectric members 21, 22. The first and second electrode members 24, 25 are either formed by coating Ag (argentum or silver), Cu (cuprum or copper), or an Ag—Cu alloy on the first and second dielectric members 21, 22. Or they are formed as Cu plates of a predetermined thickness.

The preferable thickness range of the gap spacer 23 is determined by experiments in which power consumption is reduced while spark therebetween is prevented. In more detail, the thickness of the gap spacer 23 is determined with greater emphasis on keeping a preferable distance between the first and second electrode members 24, 25 than with preventing a spark between the lead line members 261, 262 and the electrode members 24, 25. The first and second electrode members 24, 25 are then distanced from the second and first lead line members 262, 261, respectively, by two to five times the distance between the electrode members 24, 25, so that arcing is prevented between electrode members and lead line members. The preferable distance of which the electrode members 24, 25 are apart from corresponding lead line members 262, 261 is obtained by experimentation. The first and second electrode members 24, 25 are of a mesh configuration, preferably square mesh, or they are porous. A plasma reaction is more easily activated using such electrode members because they lower the triggering voltage for the corona reaction and make the corona discharge more stable.

The first and second lead line members 261, 262 are made of Ag, Cu, or an Ag—Cu alloy. The lead line members 261, 262 can be formed of an inking line (a conducting line formed within the junction holes 271, 272), or in a bolt shape such that they can be bolted into the first and second dielectric members 21, 22 through the junction holes 271, 272, respectively. A junction space 29 is formed in one of the junction holes 271, 272 between the first and second dielectric members 21, 22 and within the gap spacer 23. A spherically shaped wire mesh 281 is disposed in the junction space 29 to enhance an electrical connection between the lead line member 261 and a high voltage plug 40. Instead of the wire mesh 281, a spring 282 can be used and disposed about a plug electrode 45 of the high voltage plug 40 as a second embodiment, as shown in FIG. 1b. Accordingly, high voltage power is applied to the first lead line member 261, and the second member 262 is grounded.

According to a preferred embodiment of the present invention, when high voltage power is applied to the first lead line member 261, a corona discharge is formed in the plasma region "(P)". Electrons in the formed corona have high energies and form radicals by colliding with materials such as oxygen, nitrogen, and aqueous vapor. These radicals react with noxious materials and transform them into other materials, thus removing the noxious materials.

Figure 3:
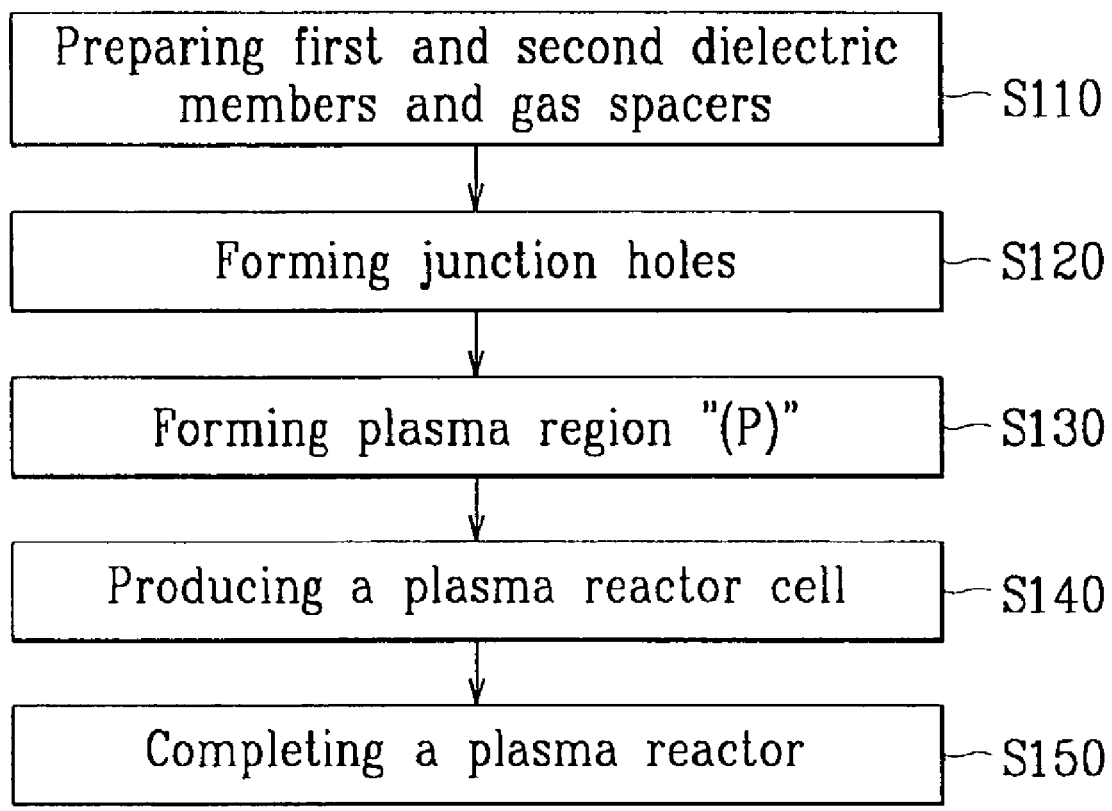
FIG. 3 is a flowchart of a method for producing plasma reactor according to a preferred embodiment of the present invention.

FIG. 3 describes a preferred embodiment of a method for producing the plasma reactor according to the present invention. At step S110, first and second dielectric members 21, 22 of a planar shape and a plurality of gap spacers 23 are prepared. The second dielectric member 22 is disposed facing the first dielectric member 21 and the gap spacer 23 insulates the first dielectric member from the second. Then, at step S120, first and second junction holes 271, 272, for receiving first and second lead line members 261, 262, respectively, are formed through corresponding sides of the first and second dielectric members 21, 22 and the gap spacers 23. Insulation is maintained by forming the junction holes 271, 272 through the dielectric members 21, 22 and the gap spacer 23. At step S130, first and second electrode members 24, 25 are formed on the first and second dielectric members 21, 22, respectively. The first and second dielectric members 21, 22 are positioned facing each other with the gap spacers 23 therebetween to form a plasma region (P) for enabling flow of noxious gas. At step S140, production of an individual plasma reactor cell (or layer) is completed by inserting the first and second lead line members 261, 262 into the first and second junction holes 271, 272, respectively, so that the lead line members 261, 262 contact corresponding electrode members. At step S150, the plasma reactor 20 is formed by accumulating a plurality of plasma reactor cells and connecting the plurality of first and second junction holes 271, 272 so that voltage can be applied to electrode members 24, 25 of the plurality of plasma reactor cells. Between the plurality of cells, auxiliary insulating or adhesive materials can be applied to the first and second members 21, 22. The plasma reactor cells are alternatingly accumulated such that the first electrode member 24 of a cell is connect to the first electrode member of another cell, and the second electrode member 25 of a cell is connected to the second electrode member another cell. The plasma reactor of multiple cells can then be installed in a housing 30, which is described in detail within, with reference to FIGS. 4 and 5.

Figure 4:
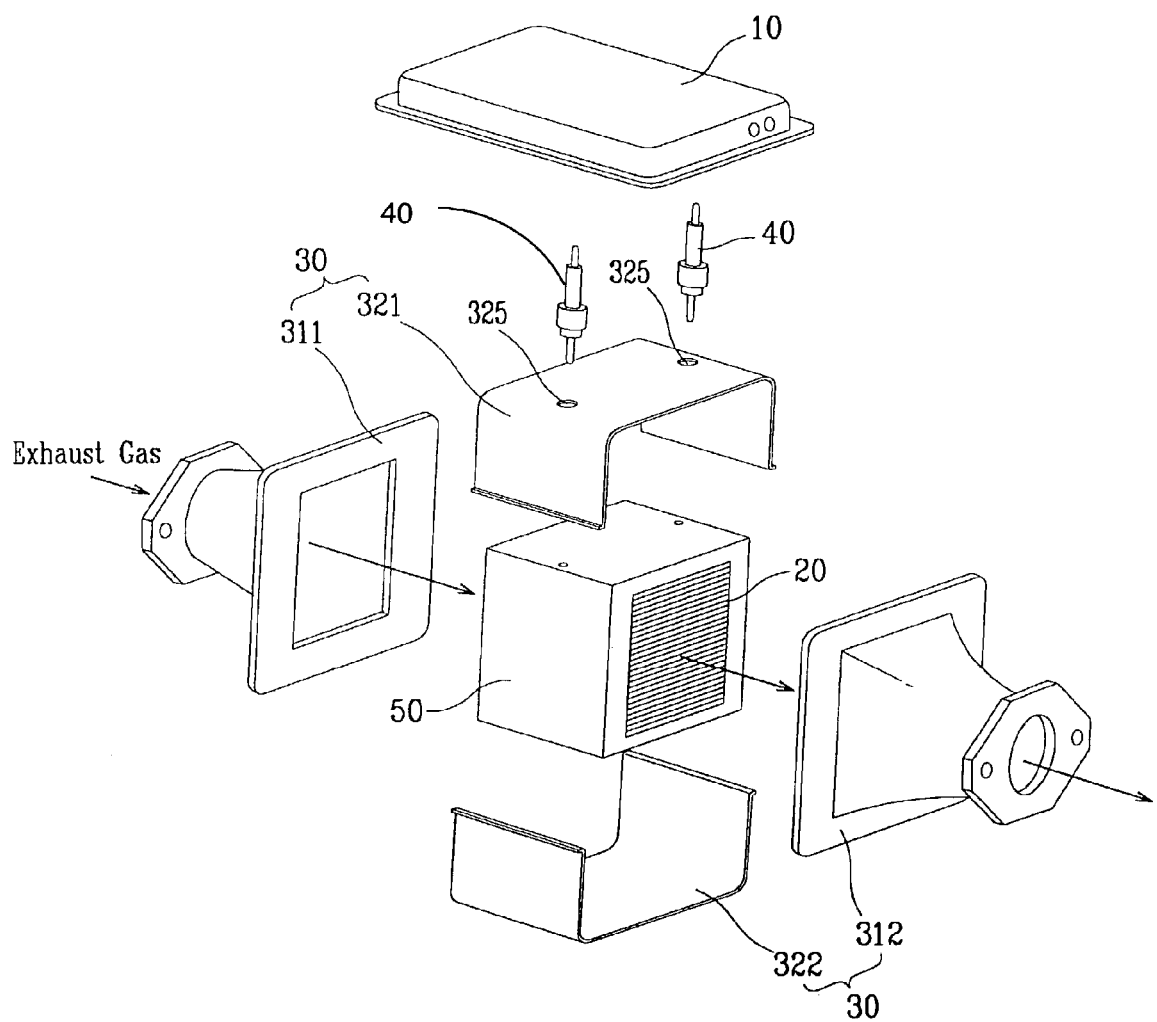
FIG. 4 is an exploded perspective view of an emission control apparatus according to a preferred embodiment of the present invention.

An emission control apparatus utilizing such a plasma reactor 20 according to a preferred embodiment of the present invention is hereinafter described in detail, with reference to FIGS. 4 and 5. This emission control apparatus utilizes a plasma reactor with a corona discharge triggered by a high voltage in the exhaust system of a gasoline or diesel engine to reduce pollutants such as PM, NOx, and HC (hydrocarbons).

An emission control apparatus utilizing a plasma reactor according to a preferred embodiment of the invention includes a housing 30, made of a conductive material, for receiving the exhaust gas of an engine. Housing 30 houses a plasma reactor 20. A mat 50 surrounds the plasma reactor 20 within the housing 30 to protect the plasma reactor 20. A power supply unit 10 applies a high voltage to the plasma reactor 20 to form a corona discharge for the plasma reaction. And at least one high voltage plug 40 transmits high voltage from the power supply unit 10 to the plasma reactor 20. The high voltage plug 40 is insulated from the housing.

Figure 5:
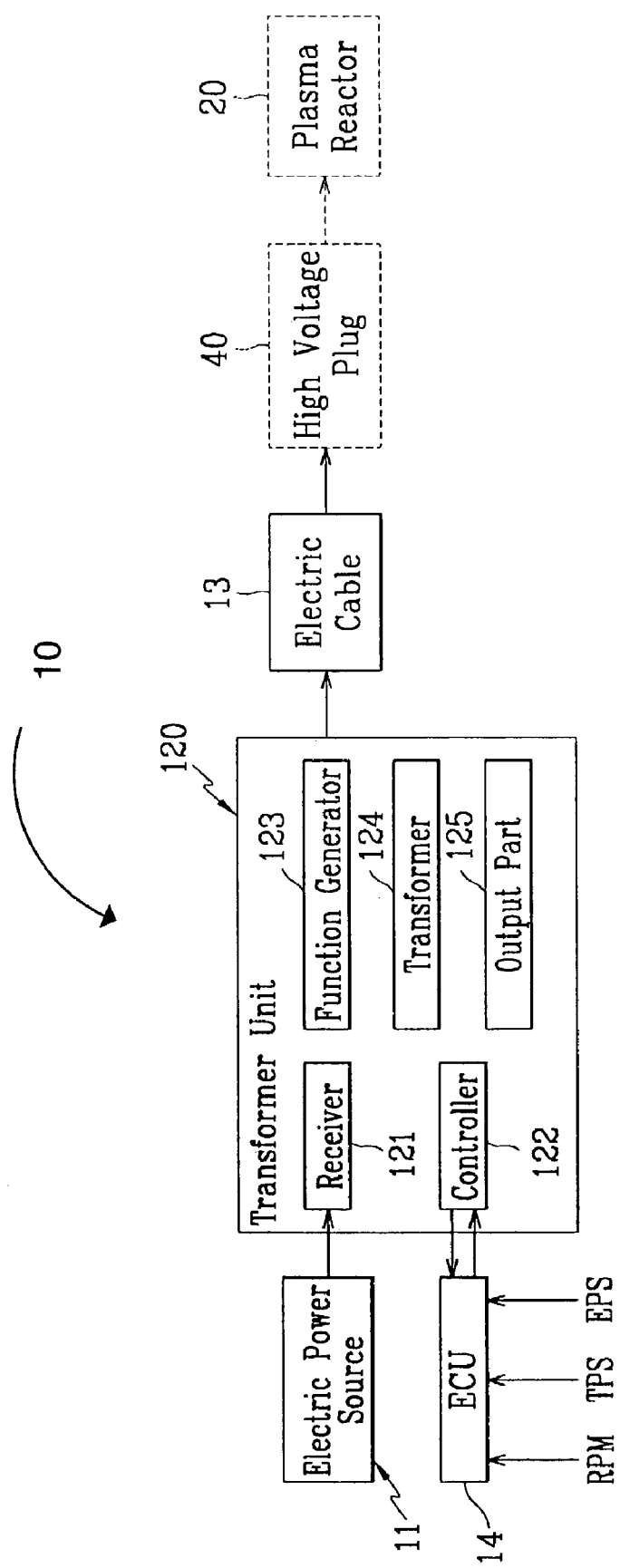
FIG. 5 is a block diagram of a power supply unit of an emission control apparatus according to a preferred embodiment of the present invention.

As shown in FIG. 5, the power supply unit 10 is connected to a power source 11 of electric power. A transformer unit 120 connected to the power source 11 transforms the electric power into an AC voltage of 100–1,000 Hz and 1–1000 kV. An electric cable 13 outputs the transformed electric power to the plasma reactor 20. The power source 11 can be a battery of a vehicle, usually of 12V or 24V, or an alternator for generating AC power, usually equipped in a vehicle as part of an engine.

In greater detail, the transformer unit 120 of the power supply unit 10 receives electric power from the power source 11 and regulates the voltage for generating a corona discharge based on signals such as throttle position and engine revolution speed (RPM) received from the ECU 14. The AC voltage of the transformed and boosted electric power is supplied to the plasma reactor 20 and forms a corona discharge for generating a plasma reaction. The high tension electric cable 13 transmits the high AC voltage to the plasma reactor 20.

The transformer unit 120 includes a receiver 121 for receiving the electric power from the power source 11. A controller 122 produces a frequency-and-voltage control signal for generating a corona discharge based on an input signal. The input signal for controller 122 is from ECU 14 outputting the signal based on a plurality of vehicle parameters such as engine revolution speed (RPM) and throttle position. A function generator 123 transforms received electric power into a sinusoidal wave of a frequency of 100–1,000 Hz according to the control signal of the controller 122. A transformer 124 boosts the voltage of the received electric power to a range of 1–100 kV according to the control signal of the controller 122. And an output part 125 outputs the transformed and boosted electric power. If electric power source 11 is AC, a filter (not shown) may be applied to the electric power before it is received by the receiver 121 so a more stable AC power is received at the receiver 121.

Figure 6:
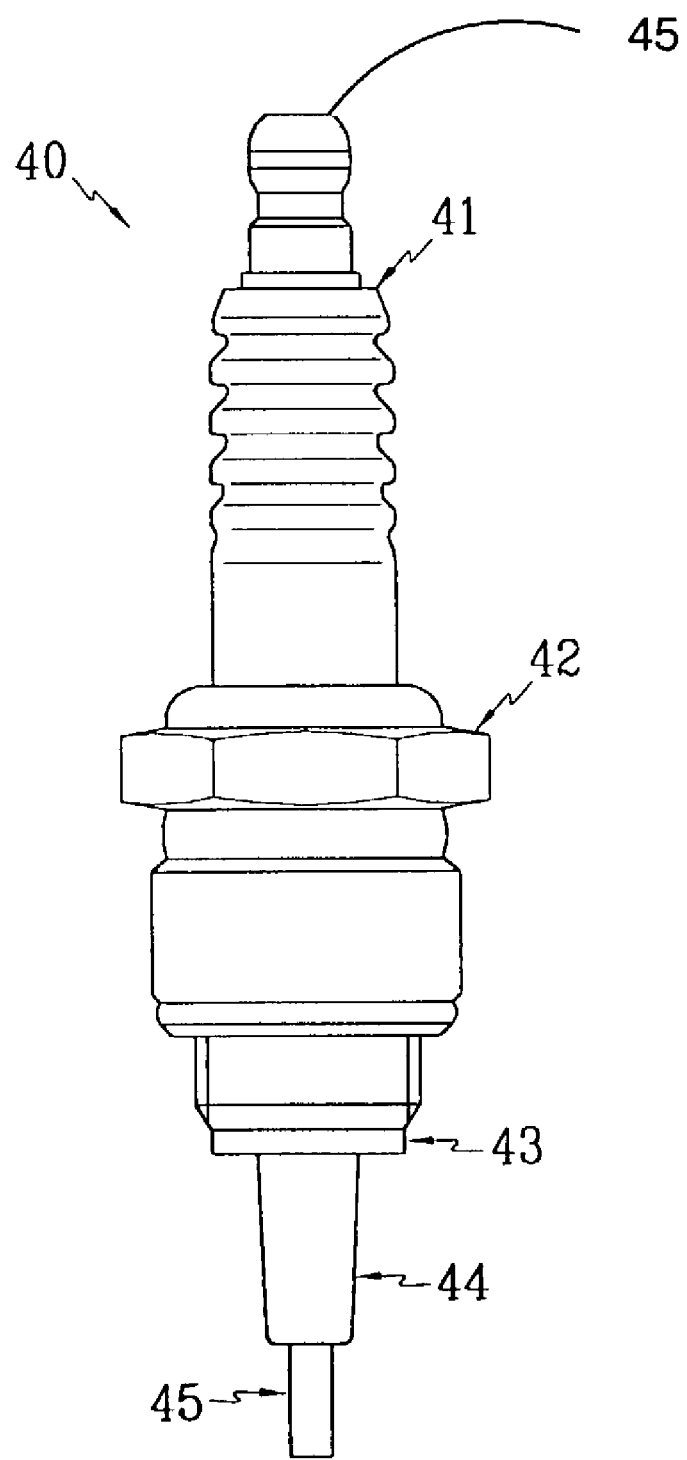
FIG. 6 is plan view of a high voltage plug of an emission control apparatus according to a preferred embodiment of the present invention.

A more detailed view of the high voltage plug 40 is shown in FIG. 6. The high voltage plug 40 includes an external plug 41 to connect to the electric cable 13. A joining part 42, formed at a lower side of the external plug 41, tightly joins the high voltage plug 40 to the housing 30 so exhaust gas does not leak through the junction. A ceramic insulator 43, formed at a lower side of the joining part 42, prevents undesired sparking to objects such as the housing 30. An internal plug 44, disposed at a lower side of the ceramic insulator 43, further insulates the transmission of electric power to the plasma reactor 20 through a plug electrode 45. Plug electrode 45 extends through the external plug 41 to the internal plug 44, such that the plug electrode 45 is connected to the electric cable 13 on one end and is exposed on the other end at the lower side of the internal plug 44.

The electric cable 13 may be connected to the external plug 41 of the high voltage plug 40 in the way usually found at connections between spark plugs and spark plug cables. The joining part 42 may be equipped with male threads for mating with female threads formed in the housing. The ceramic insulator 43 is preferably formed of a compound of alumina ($Al_2O_3$) so that it can endure, within a predetermined frequency range, at least 1.5 times the output voltage of the power supply unit 10. An insulating strength of more than 3.5 times the output voltage of the power supply unit 10 is excessive.

The number for the predetermined frequency range of 1.5 is obtained as follows. The magnitude of AC voltage is rated based on the mean effective voltage. AC power is sinusoidal and its instantaneous maximum voltage is about $\sqrt{2}$ times the mean effective voltage. Therefore, the output voltage of the power supply unit 10 is instantaneously slightly more than 1.4 times its mean effective value. Considering the tolerances and uncertainty of the power source 11 leads to the number 1.5.

The ceramic insulator 43 has a circular cross-section for preventing sparks and is installed inside the plasma reactor 20. The insulating ceramic compound, preferably of more than 90% alumina, is used where the high voltage plug 40 is installed. The high voltage plug 40, which has a similar structure to an ignition plug of an engine, is not grounded to the housing 30 or elsewhere and transmits high voltage to the first lead line member 261.

Referring back to FIG. 4, the housing 30 is adopted to protect the plasma reactor 20 from its surroundings. The ceramic mat 50 protects the plasma from vibration and prevents arcing between the housing 30 and the plasma reactor 20. The housing 30 includes conic pipes 311, 312 disposed at front and rear parts of the plasma reactor 20, respectively, to take in and expel exhaust gas from an engine. Housing members 321, 322 are disposed at upper and lower sides of the plasma reactor 20 to encapsulate the plasma reactor 20. A hole 325 for the high voltage plug 40 is formed in the housing member 321. The housing 30 is preferably made of stainless steel, which is corrosion-free and highly durable.

The mat 50 is preferably made of a compound with more than 90% alumina to enhance the insulation between the plasma reactor 20 and the housing 30. The thickness of the mat is preferably 3–5 mm and provides a better fitting installation of the plasma reactor 20 in the housing 30. The thickness of the mat 50 is determined as a value that is greater than twice the distance between the electrode members 24, 25 (FIG. 1A). In addition, a ground electrode (not shown) and a ceramic insulating plate (not shown) are disposed at uppermost and lowermost surfaces of the plasma reactor 20 to prevent arcing to the housing 30.

In a preferred embodiment of the present invention plasma reactor 20 has multiple cells.

As described above, the emission control apparatus of a preferred embodiment reduces PM and noxious gases in exhaust gas. Therefore, it can be adopted in an exhaust system of a vehicle to improve emission control. In addition, according to a preferred embodiment, power consumption is reduced by using a corona discharge. Furthermore, arcing (or short-circuiting) is prevented by the ceramic mat, and the durability of the mat and the plasma reactor is enhanced by the housing.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A plasma reactor comprising:
   a first dielectric member;
   a second dielectric member disposed facing the first dielectric member;
   at least one gap spacer disposed between the first and second dielectric members so that a plasma region is formed therebetween;

first and second electrode members, disposed on the first and second dielectric members, respectively, for generating a corona discharge; and first and second lead line members connected to the first and second electrode members so that the first and second electrode members receive electric voltage from the first and second lead line members, respectively, wherein each gap spacer has a thickness ranging from two to five times the thickness of the first and second dielectric members and wherein first and second junction holes are formed, on opposite sides of the plasma region, in the first dielectric member, the second dielectric member, and the at least one gap spacer, to provide passages for receiving the first and second lead lines respectively.

2. The plasma reactor of claim 1, wherein each surface of the first and second dielectric members in communication with the plasma region is coated with a washcoat and at least one of an oxidization catalyst and a de-NOx catalyst.

3. The plasma reactor of claim 1, wherein each surface of the first and second dielectric members in communication with the plasma region is rough so that a flow speed of an exhaust gas is reduced.

4. The plasma reactor of claim 1, wherein the first and second electrode members are formed by coating Ag, Cu, or an Ag—Cu alloy on the first and second dielectric members, respectively.

5. The plasma reactor of claim 1, wherein the first and second electrode members are Cu plates.

6. The plasma reactor of claim 1, wherein the first and second electrode members are separated from the second and first lead line members, respectively, by a distance in the range of two to five times the distance between the electrode members.

7. The plasma reactor of claim 1, wherein the first and second electrode members are of a mesh configuration, or are porous.

8. The plasma reactor of claim 1, wherein the first and second lead line members are made of Ag, Cu, or an Ag—Cu alloy.

9. The plasma reactor of claim 1, wherein the lead line members are of an inking line.

10. The plasma reactor of claim 1, wherein the lead line members are bolted into the first and second dielectric members.

11. The plasma reactor of claim 1, further comprising a spherically shaped wire mesh disposed in a junction hole formed within the gap spacer to enhance an electrical connection to the lead line member.

12. A method for producing a plasma reactor, comprising:
preparing first and second dielectric members of a planar shape, and a plurality of gap spacers, wherein each gap spacer has a thickness ranging from two to five times the thickness of the first and second dielectric members;
orienting the second dielectric member to face the first dielectric member with the plurality of gap spacers positioned therebetween to insulate the first dielectric member from the second so that a plasma region for enabling flow of exhaust gas is formed;
forming first and second junction holes, on opposite sides of the plasma region, in the first dielectric member, the second dielectric member, and the at least one gap spacer, to form passages for receiving first and second lead line members, respectively,;
disposing an electrode member on each of the first and second dielectric members away from the plasma region; and
producing a plasma reactor cell by inserting the first and second lead line members, respectively, into the first and second junction holes so the lead line members contact corresponding electrode members.

13. The plasma reactor production method of claim 12, further comprising: accumulating a plurality of the plasma reactor cells; and inserting conductive material into the first and second junction holes so that voltage can be applied to the electrode members of the plurality of plasma reactor cells.

14. The plasma reactor production method of claim 12, wherein each noxious gas contacting surface of the first and second dielectric members is coated with a washcoat and at least one of an oxidization catalyst and a de-NOx catalyst.

15. The plasma reactor production method of claim 12, wherein each noxious gas contacting surface of the first and second dielectric members is rough to reduce a flow speed of an exhaust gas.

16. The plasma reactor production method of claim 12, wherein the first and second electrode members are formed by coating Ag, Cu, or an Ag—Cu alloy on the first and second dielectric members, respectively.

17. The plasma reactor production method of claim 12, wherein the first and second electrode members are Cu plates of a predetermined thickness.

18. The plasma reactor production method of claim 12, wherein the first and second electrode members are separated from the second and first lead line members, respectively, by a distance in the range of two to five times of that between the electrode members.

19. The plasma reactor production method of claim 12, wherein the first and second electrode members are of a mesh configuration, or are porous.

20. The plasma reactor production method of claim 12, wherein the first and second lead line members are made of Ag, Cu, or an Ag—Cu alloy.

21. The plasma reactor production method of claim 12, wherein the lead line members are of an inking line.

22. The plasma reactor production method of claim 12, wherein the lead line members are bolted into the first and second dielectric members.

23. An emission control apparatus for an engine, comprising:
a housing for receiving exhaust gas from the engine;
a plasma reactor disposed in the housing, the plasma reactor comprising:
a first dielectric member,
a second dielectric member disposed facing the first dielectric member,
at least one gap spacer disposed between the first and second dielectric members such that a plasma region is formed therebetween,
first and second electrode members disposed on the first and second dielectric members, respectively, for generating a corona discharge, and
first and second lead line members connected to the first and second electrode members so that the first and second electrode members transmit electric voltage from the first and second lead line members, respectively, wherein
each gap spacer has a thickness ranging from two to five times the thickness of the first and second dielectric members and wherein first and second junction holes are formed, on opposite sides of the plasma region, in the first dielectric member, the second dielectric member, and the at least one gap spacer, to provide passages for receiving the first and second lead lines respectively;

a mat situated between the plasma reactor and the housing;

a power supply unit, comprising:
  a power source of electric power,
  a transformer unit for transforming the electric power to an AC voltage of 100–1,000 Hz and 1–100 kV, and
  an electric cable for outputting the transformed electric power; and a plug for receiving the transformed electric power through the electric cable, and for transmitting the received transformed electric power to the plasma reactor, wherein the plug comprises:
  an external plug connected to the electric cable;
  a joining part, formed at a lower side of the external plug, for tightly joining the plug to the housing so that exhaust gas does not leak through the junction;
  a ceramic insulator, formed at a lower side of the joining part, for preventing arcing, wherein the ceramic insulator endures, within a predetermined frequency range, at least 1.5 times the output voltage of the power supply unit;
  an internal plug, disposed at a lower side of the ceramic insulator, for preventing sparking; and
  a plug electrode, penetrating from the external plug through the internal plug, so that the plug electrode is connected to the electric cable and exposed at a lower side of the internal plug.

24. The emission control apparatus for an engine of claim 23, wherein the transformer unit comprises: a receiver for receiving the electric power from the power source; a controller for producing a frequency-and-voltage control signal for generating a corona discharge; a function generator for transforming the electric power to an AC voltage with a frequency of 100–1,000 Hz according to the control signal; a transformer for boosting voltage of the electric power to a range of 1–100 kV according to the control signal; and an output part for outputting the transformed and boosted electric power.

25. The emission control apparatus for an engine of claim 23, wherein the ceramic insulator has a circular cross-section and is installed inside the plasma reactor.

26. The emission control apparatus for an engine of claim 23, further comprising an elastic member disposed at the plug electrode so that an electrical connection to the lead line member is enhanced.

27. The emission control apparatus for an engine of claim 23, wherein the housing is made of stainless steel.

28. The emission control apparatus for an engine of claim 23, wherein insulating ceramic, having a compound of alumina, is applied to a portion where the plug is installed.

29. The emission control apparatus for an engine of claim 23, wherein the mat is 3–5 mm in thickness and is made of a compound with more than 90% alumina.

30. The emission control apparatus for an engine of claim 23, wherein a thickness of the mat is more than twice the distance between the first and second electrode members.

* * * * *